(12) United States Patent
Wakabayashi

(10) Patent No.: US 12,242,177 B2
(45) Date of Patent: Mar. 4, 2025

(54) PROJECTOR WITH INCREASED LIGHT EMISSION

(71) Applicant: SEIKO EPSON CORPORATION, Tokyo (JP)

(72) Inventor: Junichi Wakabayashi, Ueda (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/903,198

(22) Filed: Sep. 6, 2022

(65) Prior Publication Data

US 2023/0074488 A1 Mar. 9, 2023

(30) Foreign Application Priority Data

Sep. 6, 2021 (JP) ................................. 2021-144557

(51) Int. Cl.
*G03B 21/20* (2006.01)
*G02B 27/10* (2006.01)
(Continued)

(52) U.S. Cl.
CPC ..... *G03B 21/2006* (2013.01); *G02B 27/1026* (2013.01); *G02B 27/1046* (2013.01);
(Continued)

(58) Field of Classification Search
CPC .... G03B 21/005; G03B 21/006; G03B 21/28; G03B 21/142; G03B 21/145; G03B 21/2006; G03B 21/2053; G03B 21/2073; H04N 9/315; H04N 9/3102; H04N 9/3141; H04N 9/3152; H04N 9/3155;
(Continued)

(56) References Cited

U.S. PATENT DOCUMENTS 5,914,817 A * 6/1999 Browning .......... G02B 27/1026
349/5
6,057,894 A * 5/2000 Kobayashi ........... H04N 9/3105
349/8

(Continued)

FOREIGN PATENT DOCUMENTS

JP 2000-321573 A 11/2000
JP 2001-066695 A 3/2001
(Continued)

*Primary Examiner* — Sultan Chowdhury
(74) *Attorney, Agent, or Firm* — Dority & Manning, P.A.

(57) ABSTRACT

A projector includes a lamp unit, a color separation system that separates first light outputted from the lamp unit into a plurality of color beams, a plurality of liquid crystal panels that modulate the plurality of separated color beams from the color separation system, reduction optical systems that reduce at least one of pencils of light formed of the plurality of color beams modulated by the plurality of liquid crystal panels, a light combining prism that combines the plurality of reduced color beams with one another, and a projection lens that projects second light that is the combined light from the light combining prism. The reduction optical systems are disposed between the liquid crystal panels and the light combining prism, and the area of an effective display region of each of the liquid crystal panels is greater than an effective area of each light incident surface of the light combining prism.

3 Claims, 5 Drawing Sheets

(51) Int. Cl.
*G02B 27/12* (2006.01)
*G02B 5/30* (2006.01)
*G02B 27/28* (2006.01)

(52) U.S. Cl.
CPC .......... *G02B 27/126* (2013.01); *G02B 5/3058* (2013.01); *G02B 27/286* (2013.01); *G03B 21/2073* (2013.01)

(58) Field of Classification Search
CPC .. H04N 9/3158; G02B 27/126; G02B 27/141; G02B 27/149; G02B 27/286; G02B 27/1026; G02B 27/1046
See application file for complete search history.

(56) References Cited

U.S. PATENT DOCUMENTS

| | | | | |
|---|---|---|---|---|
| 6,340,230 | B1* | 1/2002 | Bryars | H04N 9/3102 353/31 |
| 6,457,829 | B1 | 10/2002 | Nakazawa et al. | |
| 6,556,256 | B1* | 4/2003 | Kato | H04N 9/3114 359/833 |
| 7,699,475 | B2* | 4/2010 | Wu | G03B 21/20 353/122 |
| 2005/0219847 | A1* | 10/2005 | Ikeda | G02B 27/149 362/268 |
| 2007/0201006 | A1 | 8/2007 | Amano et al. | |
| 2009/0027623 | A1* | 1/2009 | Kawamura | H04N 9/3105 359/615 |
| 2010/0309443 | A1* | 12/2010 | Cheng | G02B 26/0883 353/122 |
| 2012/0092626 | A1* | 4/2012 | Chang | G03B 21/208 353/38 |
| 2013/0063701 | A1* | 3/2013 | Ouderkirk | H04N 9/3167 359/489.08 |
| 2015/0163469 | A1 | 6/2015 | Someya | |
| 2017/0235433 | A1* | 8/2017 | Kaneda | G03B 21/2073 345/175 |
| 2019/0049825 | A1 | 2/2019 | Kodama et al. | |

FOREIGN PATENT DOCUMENTS

| | | |
|---|---|---|
| JP | 2007-232799 A | 9/2007 |
| JP | 2015-225210 A | 12/2015 |
| JP | 2019-032496 A | 2/2019 |
| WO | WO2013/069039 A | 5/2013 |

* cited by examiner

PROJECTOR WITH INCREASED LIGHT EMISSION

The present application is based on, and claims priority from JP Application Serial Number 2021-144557, filed Sep. 6, 2021, the disclosure of which is hereby incorporated by reference herein in its entirety.

BACKGROUND

1. Technical Field

The present disclosure relates to a projector.

2. Related Art

WO 2013/069039 discloses a projection-type video display apparatus corresponding to a projector including a light source, lens arrays, a light collector lens, a color separation system, a video display device corresponding to liquid crystal panels, a light combining prism, and a projection lens. To enhance the brightness performance of the thus configured projector, it is conceivable to increase the size of the effective display region of each of the liquid crystal panels and the size of the light combing prism.

In the projector described in WO 2013/069039, however, increasing the size of the light combining prism in accordance with the increase in the size of the effective display region of each of the liquid crystal panels increases the sizes of the light combining prism, the projection lens, and other components, resulting in a problem of increases in the size and weight of the projector.

SUMMARY

A projector includes a light source apparatus, a color separation system that separates first light outputted from the light source apparatus into a plurality of color beams, a plurality of light modulators that modulate the plurality of separated color beams from the color separation system, reduction optical systems that reduce at least one of pencils of light formed of the plurality of color beams modulated by the plurality of light modulators, a light combining prism that combines the plurality of reduced color beams with one another, and a projection optical apparatus that projects second light that is the combined light from the light combining prism. The reduction optical systems are disposed between the light modulators and the light combining prism, and an area of an effective display region of each of the light modulators is greater than an effective area of each light incident surface of the light combining prism.

DESCRIPTION OF EXEMPLARY EMBODIMENTS

The drawings show axes X, Y, and Z as three axes perpendicular to one another for convenience of description. The direction parallel to the axis X is also referred to as an "axis-X direction," the direction parallel to the axis Y as an "axis-Y direction," and the direction parallel to the axis Z as an "axis-Z direction. The axis-Z direction extends along the vertical direction, and the plane XY extends along the horizontal plane. The tip side of the arrow indicating each of the axes is also referred to as a "positive side", and the base side of the arrow as a "negative side". The positive side in the axis-Z direction is also referred to as "upper", and the negative side in the axis-Z direction as "lower".

Furthermore, in the following description, focusing, for example, on a substrate, it is assumed that the phrase "something is disposed on the substrate" represents a case where something is disposed in contact with the substrate, a case where something is disposed above the substrate via another structure, or a case where something is disposed partly in contact with the substrate and partly via another structure.

The configuration of a projector 1000 according to an embodiment of the present disclosure will first be described with reference to FIG. 1.

Figure 1:
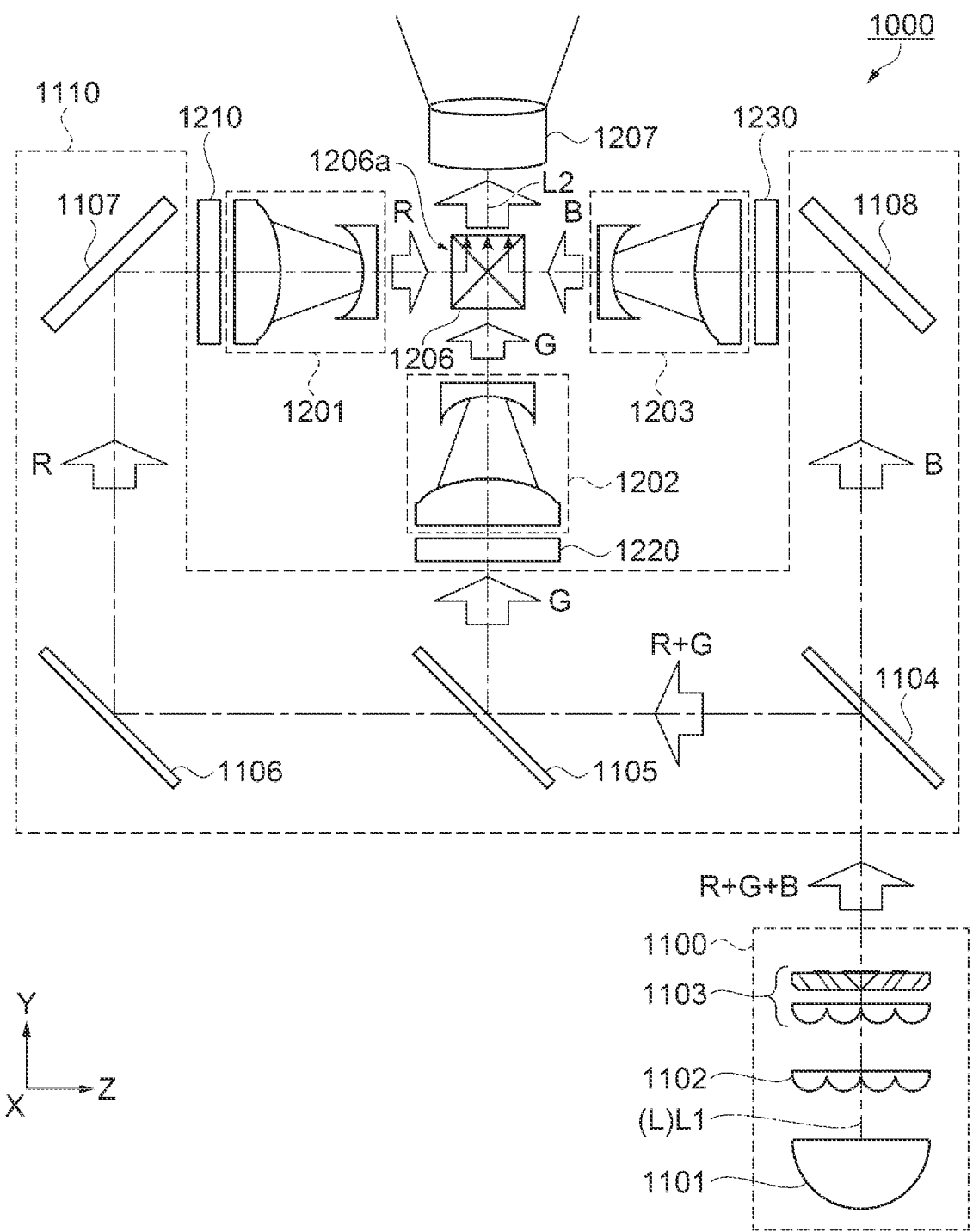
FIG. 1 is a schematic view showing the configuration of a projector.

The projector 1000 includes a polarized light illuminator 1100 and a color separation system 1110, which are disposed along a system optical axis L, as shown in FIG. 1.

The polarized light illuminator 1100 includes, for example, a lamp unit 1101 as a light source apparatus formed of a white light source, such as an ultrahigh-pressure mercury lamp and a halogen lamp, an optical integration lens 1102, and a polarization converter 1103.

The color separation system 1110 includes two dichroic mirrors 1104 and 1105 and three reflection mirrors 1106, 1107, and 1108.

The dichroic mirror 1104 transmits blue light (B) and reflects red light (R) and green light (G) out of first light L1 outputted from the polarized light illuminator 1100. The other dichroic mirror 1105 reflects the green light (G) reflected off the dichroic mirror 1104 and transmits the red light (R) reflected off the dichroic mirror 1104.

The red light (R) having passed through the dichroic mirror 1105 is reflected off the reflection mirrors 1106 and 1107 and then enters a liquid crystal light valve 1210. The green light (G) reflected off the dichroic mirror 1105 enters a liquid crystal light valve 1220. The blue light (B) having passed through the dichroic mirror 1104 is reflected off the reflection mirror 1108 and then enters a liquid crystal light valve 1230.

The projector 1000 further includes three reduction optical systems 1201, 1202, and 1203, three transmissive liquid crystal light valves 1210, 1220, 1230 as three light modulators, a light combining prism 1206, and a projection lens 1207 as a projection optical apparatus.

The reduction optical systems 1201, 1202, and 1203 are disposed so as to face respective color light incident surfaces of the light combining prism 1206. The color beams having entered the liquid crystal light valves 1210, 1220, and 1230 are modulated based on video information (video signal) and outputted via the reduction optical system 1201, 1202, and 1203 toward the light combining prism 1206. The prism is formed of four right-angled prisms bonded to each other, and a dielectric multilayer film that reflects the red light and a dielectric multilayer film that reflects the blue light are formed in a cross shape at the inner surfaces of the bonded prisms. The dielectric multilayer films combine the three color beams with one another into light representing a color image. Second light L2 as a result of the combination is projected onto a screen via the projection lens 1207 to display a magnified image.

The liquid crystal light valve 1210 includes a liquid crystal panel 100, which will be described later and serves as each of the light modulators. A pair of polarizers disposed in a crossed-Nicol arrangement with a gap therebetween on the light incident side and light exiting side of the liquid crystal panel 100. The same holds true for the other liquid crystal light valves 1220 and 1230.

The reduction optical systems 1201, 1202, and 1203 will be described later in detail.

The configuration of the liquid crystal panel 100 will next be described with reference to FIGS. 2 and 3.

Figure 2:
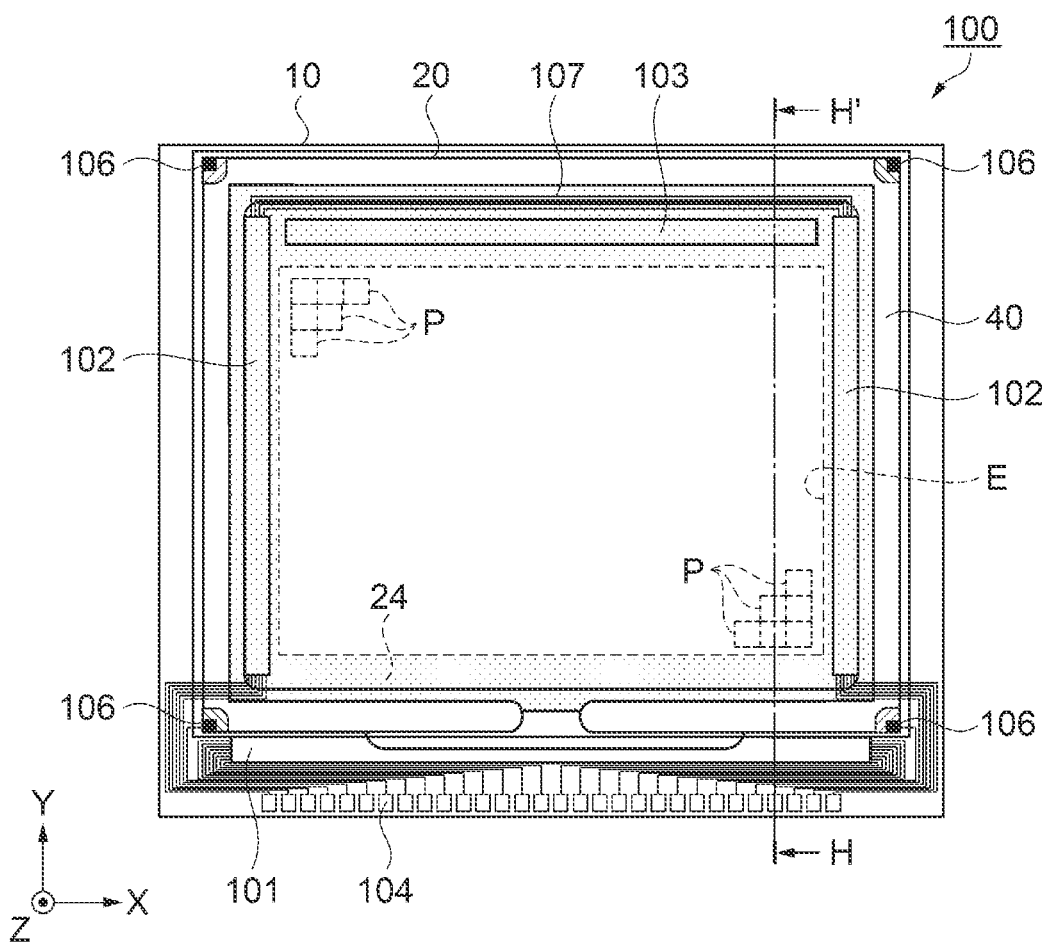
FIG. 2 is a plan view showing the configuration of a liquid crystal panel.
Figure 3:
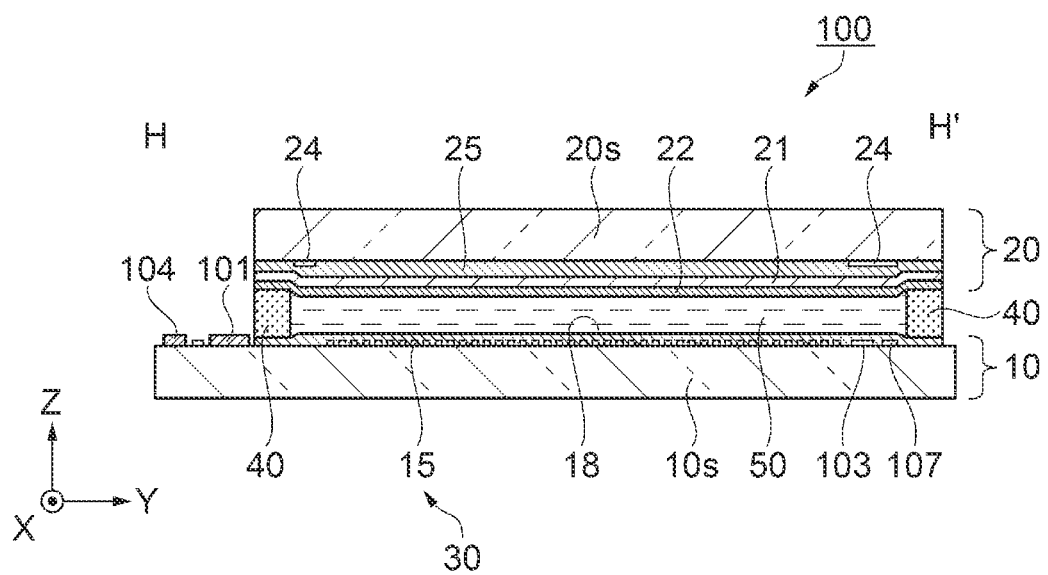
FIG. 3 is a cross-sectional view of the liquid crystal panel shown in FIG. 2 and taken along the line H-H'.

The liquid crystal panel 100 in the present embodiment includes a device substrate 10, a counter substrate 20 disposed so as to face the device substrate 10, and a liquid crystal layer 50 including a liquid crystal material sandwiched between the device substrate 10 and the counter substrate 20, as shown in FIGS. 2 and 3.

A substrate 10s of the device substrate 10 is formed, for example, of a glass substrate, a quartz substrate, or any other suitable substrate. A substrate 20s of the counter substrate 20 is formed, for example, of a glass substrate, a quartz substrate, or any other suitable transparent substrate.

The device substrate 10 is larger in shape in the plan view than the counter substrate 20. The device substrate 10 and the counter substrate 20 are joined to each other via a sealant 40 disposed along the outer edge of the counter substrate 20. A liquid crystal material having positive or negative dielectric anisotropy is encapsulated in the gap between the device substrate 10 and the counter substrate 20 to form the liquid crystal layer 50.

An effective display region E including a plurality of pixels P arranged in a matrix is provided at the inner side of the sealant 40. A parting section 24, which surrounds the effective display region E, is provided between the sealant 40 and the effective display region E. A dummy pixel region that is not shown and does not contribute to display operation, is provided around the effective display region E.

The device substrate 10 is provided with a terminal section in which a plurality of externally coupling terminals 104 are arranged. A data line drive circuit 101 is provided between a first edge section, which extends along the terminal section, and the sealant 40. An inspection circuit 103 is provided between the effective display region E and the sealant 40 that extends along a second edge section facing the first edge section.

Scan line drive circuits 102 are provided between the effective display region E and the sealant 40 that extends along third and fourth edge sections that face each other and are perpendicular to the first edge section. A plurality of wires 107, which link the two scan line drive circuits 102 to each other, are provided between the inspection circuit 103 and the sealant 40 extending along the second edge section.

The wires linked to the data line drive circuit 101 and the scan line drive circuits 102 are coupled to the plurality of externally coupling terminals 104 arranged along the first edge section. The arrangement of the inspection circuit 103 is not limited to the arrangement described above.

In the present specification, directions ±X are the directions along the first edge section. Directions ±Y are the directions perpendicular to the first edge section and extending along the third and fourth edge sections, which face each other. Directions ±Z are the directions perpendicular to the directions ±X and ±Y and coincide with the directions of a normal to the device substrate 10 and the counter substrate 20.

Light transmissive pixel electrodes 15 and transistors TFT 30, the latter of which serve as switching devices and both of which are provided in correspondence with the pixels P, signal wires, an orientation film 18, which covers the pixel electrodes 15, the transistors TFT 30, and the signal wires are provided on a surface of the substrate 10s, the surface facing the liquid crystal layer 50, as shown in FIG. 3. The TFTs 30 and the pixel electrodes 15 are elements that form the pixels P. The device substrate 10 includes the substrate 10s, the pixel electrodes 15 provided on the substrate 10s, the TFTs 30, the signal wires, and the orientation film 18. The pixel electrodes 15 are provided in correspondence with the TFTs 30.

The parting section 24, an insulating layer 25 deposited so as to coat the parting section 24, a counter electrode 21 as a common electrode provided so as to coat the insulating layer 25, and an orientation film 22, which coats the counter electrode 21, are provided on a surface of the substrate 20s, the surface facing the liquid crystal layer 50. The counter substrate 20 in the present embodiment includes at least the parting section 24, the counter electrode 21, and the orientation film 22.

The parting section 24 is provided in a position where the parting section 24 surrounds the effective display region E and overlaps with the scan line drive circuits 102 and the inspection circuit 103 in the plan view, as shown in FIG. 2. Light to be incident on the circuits described above from the side facing the counter substrate 20 is thus blocked, whereby malfunction of the circuits due to the light incident thereon is prevented. Furthermore, unnecessary stray light is blocked so as not to be incident on the effective display region E, whereby high contrast is ensured in a content displayed at the effective display region E.

The insulating layer 25 is made, for example, of an inorganic material having light transparency, such as silicon oxide. The insulating layer 25 is provided so as to coat the parting section 24 and planarize the surface thereof facing the liquid crystal layer 50.

The counter electrode 21 is formed of a transparent, electrically conductive film made, for example, of ITO (indium tin oxide) or IZO (indium zinc oxide), coats the insulating layer 25, and is electrically coupled to upper and lower electrically conductive sections 106 provided at the four corners of the counter substrate 20. The upper and lower electrically conductive sections 106 are electrically coupled to the wires provided at the device substrate 10.

The orientation film 18, which coats the pixel electrodes 15, and the orientation film 22, which coats the counter electrode 21, are selected based on the optical design of the liquid crystal panel 100. The orientation films 18 and 22 may each be formed of an inorganic orientation film made, for example, of silicon oxide or an organic orientation film made, for example, of polyimide.

The thus configured liquid crystal panel 100 is, for example, a transmissive liquid crystal panel, and is designed in accordance with a normally-white-mode optical design in which the transmittance of a pixel P to which no voltage is applied is greater than the transmittance of the pixel P to which a voltage is applied, or a normally-black-mode optical design in which the transmittance of a pixel P to which no voltage is applied is smaller than the transmittance of the pixel P to which a voltage is applied. In the liquid crystal panel 100 including the device substrate 10 and the counter substrate 20, polarizers are disposed on the light incident side and the light exiting side in accordance with the optical design of the liquid crystal panel 100.

The configuration of the reduction optical systems 1201, 1202, and 1203 will next be described with reference to FIG. 4. The configuration of the reduction optical system 1201 will be described below because the reduction optical systems 1201, 1202, and 1203 have the same configuration.

The reduction optical system 1201 is disposed between the liquid crystal light valve 1210, which includes the liquid crystal panel 100, and the light combining prism 1206, as described above. The reduction optical system 1201 reduces the pencil of light of a plurality of modulated red light (R) beams.

Figure 4:
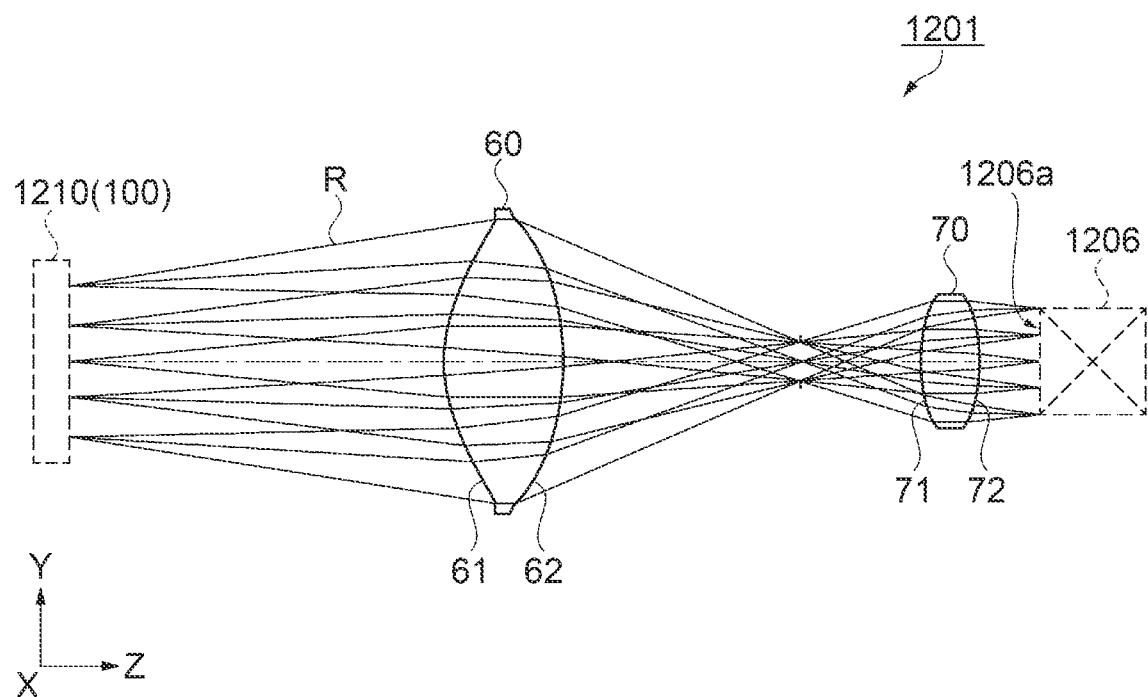
FIG. 4 is a schematic view showing the configuration of a reduction optical system.

The reduction optical system 1201 is formed, for example, of a relay optical system using two convex lenses and includes a first lens 60 and a second lens 70, as shown in FIG. 4.

The first lens 60 has, for example, a first surface 61 and a second surface 62. The second lens 70 has, for example, a third surface 71 and a fourth surface 72. The second surface 62, the third surface 71, and the fourth surface 72 are each, for example, a spherical surface. The first surface 61 is, for example, an aspherical surface. In this case, the shape of the first surface 61 may be produced by using a general design approach such as optimized simulation.

The first surface 61, the second surface 62, the third surface 71, and the fourth surface 72 may be formed solely of spherical surfaces, formed solely of aspherical surfaces, or formed of a combination of spherical and aspherical surfaces. The surfaces are each not necessarily formed of a specific surface. The reduction optical systems 1201, 1202, and 1203 shown in FIG. 1 are each shown in a simplified form.

The reduction optical system 1201 causes the red light (R) brought into focus at the liquid crystal panel 100 to be brought into focus again in the vicinity of the upstream of the light combining prism 1206 after successively passing through the first lens 60 and the second lens 70.

The reduction factor of the reduction optical system 1201 in the present embodiment is, for example, 0.73. It is preferable that the reduction factor is selected as appropriate in accordance with the projector 1000 to be used.

The pencil of light formed of the beams that exit out of the reduction optical system 1201 is preferably a parallelized pencil of light, and has, for example, a divergent or convergent angle of ±5° or smaller. The thus set angle allows reduction of the pencil of light outputted from the liquid crystal panel 100 and entrance of the reduced light into the light combining prism 1206.

The relationship between the size of the effective display region E of the liquid crystal panel 100 and the size of the light combining prism 1206 will next be described with reference to FIG. 5.

Figure 5:
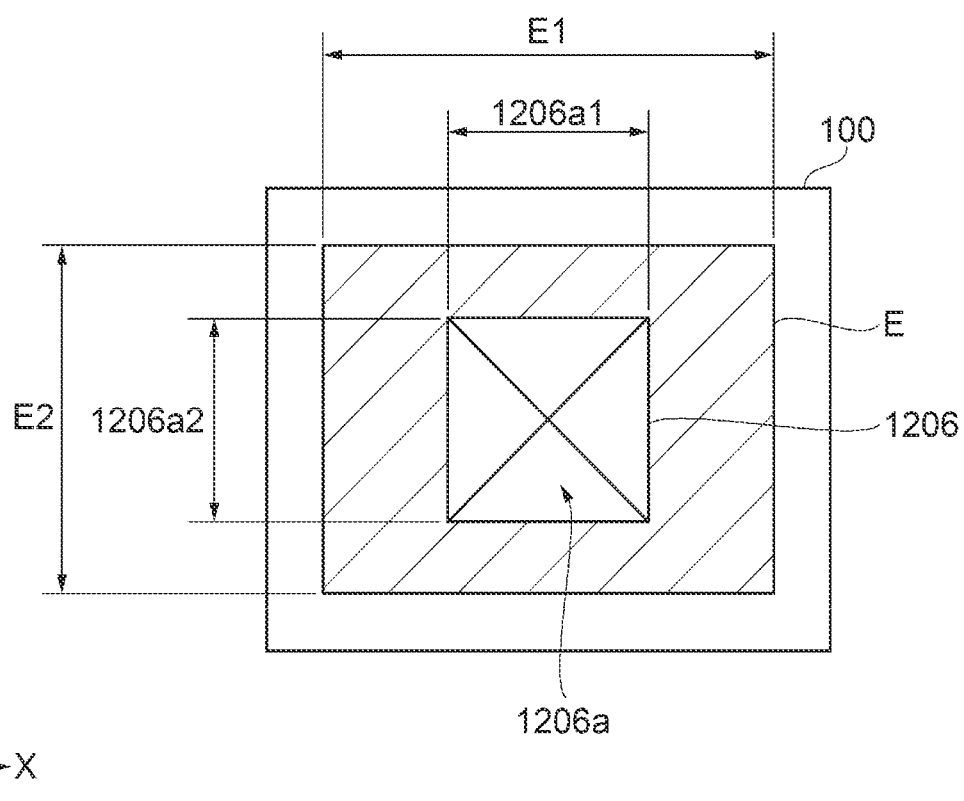
FIG. 5 shows the relationship between an effective display region and an effective area.

The area of the effective display region E of the liquid crystal panel 100 is greater than the effective area of each light incident surface 1206a of the light combining prism 1206, as shown in FIG. 5.

Specifically, for example, a direction-X width E1 of the effective display region E of the liquid crystal panel 100 is greater than a direction-X width 1206a1 of the light combining prism 1206. Furthermore, for example, a direction-Y width E2 of the effective display region E of the liquid crystal panel 100 is greater than a direction-Y width 1206a2 of the light combining prism 1206. That is, the area of the effective display region E of the liquid crystal panel 100 is greater than the effective area of the light combining prism 1206. In other words, the size of the light to be incident on the light combining prism 1206 is smaller than the size of the effective display region E of the liquid crystal panel 100.

When the light combining prism 1206 is provided with a functional film such as an antireflection film, the area of the functional film is considered as the effective area.

The size of the liquid crystal panel 100 may be determined based on the light resistance performance of the liquid crystal panel 100 and the brightness performance of the projector 1000 in operation. A compact projector 1000 that excels in brightness performance can thus be provided.

Figure 6:
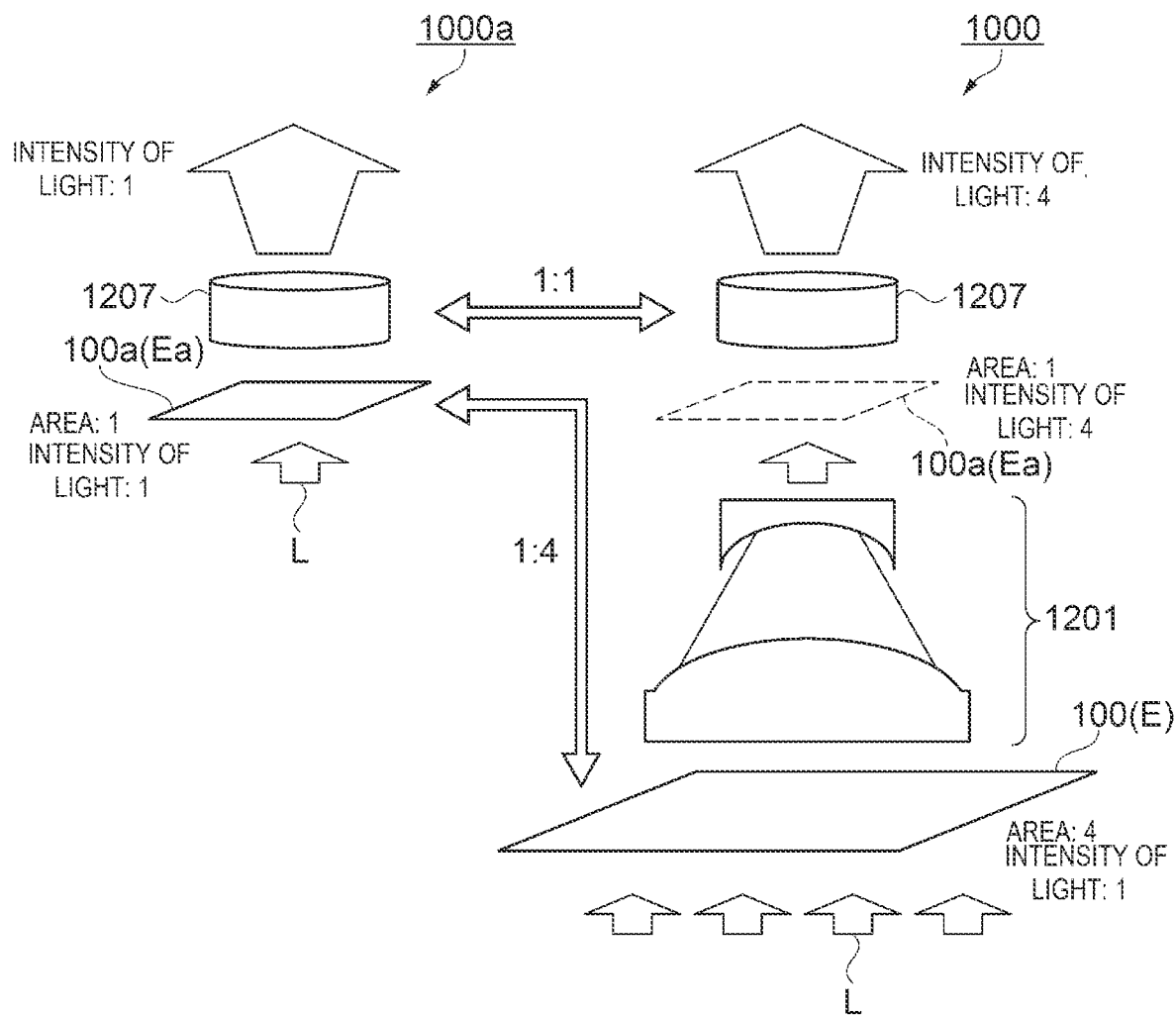
FIG. 6 shows an effect provided by the present embodiment.

The brightness performance in the present embodiment will next be compared with the brightness performance in related art with reference to FIG. 6. The numerical values used below are merely presented only for comparison purposes.

The intensity (magnitude of illuminance) of the light projected by a projector 1000a of related art will first be described. The projector 1000a of related art includes, for example, a liquid crystal panel 100a having a size of "1×1", that is, an effective display region Ea having an area of "1", on which light having an intensity of "1" is incident, as shown in the left portion of FIG. 6. The light having the intensity of "1" can be projected as it is via the projection lens 1207.

The intensity of the light projected by the projector 1000 according to the present embodiment will next be described. The projector 1000 according to the present embodiment includes, for example, the liquid crystal panel 100 having a size of "2×2", that is, the effective display region E having an "area of 4", on which the light having the intensity of "1" is incident, as shown in the right portion of FIG. 6. Assuming that the size of the light having the intensity of "1" is reduced via the reduction optical system 1201 to the size of the liquid crystal panel 100a having the size of "1×1", which is the size in related art, the light having the intensity of "1" becomes the light having an intensity of "4" at the effective display region Ea having the area of "1". The light having the intensity of "4" can therefore be projected via the projection lens 1207. Provided that the projectors 1000 and 1000a perform projection onto the same projection area, the projector 1000 projects a luminous flux having an intensity four times that of the luminous flux projected by the projector 1000a. In other words, the projector 1000 can provide illuminance four times the illuminance provided by the projector 1000a. It is noted that the light resistance of the liquid crystal panel 100 in the present embodiment is the same as that of the liquid crystal panel 100a of related art. It is further noted that the projector 1000a of related art and the projector 1000 according to the present embodiment use the same projection lens 1207.

That is, increasing the size of the liquid crystal panel 100 allows an increase in the amount of light that exits out of the projection lens 1207 without an increase in the density of the light incident on the liquid crystal panel 100. Providing the reduction optical system 1201 eliminates the need to enlarge the light combining prism 1206 and the projection lens 1207 in accordance with the size of the liquid crystal panel 100. Increases in the size and weight of the projector 1000 can thus be suppressed. In addition, an increase in the cost of the projector 1000 can be suppressed. Moreover, the present embodiment is suitable for ultrahigh luminous flux projectors.

As described above, the projector 1000 according to the present embodiment includes the lamp unit 1101, the color separation system 1110, which separates the first light L1 outputted from the lamp unit 1101 into a plurality of color beams, the plurality of liquid crystal panels 100, which modulate the plurality of separated color beams from the color separation system 1110, the reduction optical systems 1201, 1202, and 1203, which reduce at least one of pencils of light formed of the plurality of color beams modulated by the plurality of liquid crystal panels 100, the light combining prism 1206, which combines the plurality of reduced color beams with one another, and the projection lens 1207, which projects the second light L2, which is the combined light from the light combining prism 1206. The reduction optical systems 1201, 1202, and 1203 are disposed between the liquid crystal panels 100 and the light combining prism 1206, and the area of the effective display region E of each of the liquid crystal panels 100 is greater than the effective area of each of the light incident surfaces 1206*a* of the light combining prism 1206.

According to the configuration described above, even when the area of the effective display region E of each of the liquid crystal panels 100 is increased, the reduction optical systems 1201, 1202, and 1203, which are disposed on the upstream of the light combining prism 1206, can reduce the pencil of light, whereby increases in the sizes of the light combining prism 1206 and the projection lens 1207 (diameter of light-incident-side lens, in particular) can be suppressed. As a result, increases in the size and weight of the projector 1000 can thus be suppressed. Since the liquid crystal panels 100 each have a large effective display region E, so that an increase in the density per unit area of the light incident on the effective display region E is suppressed, degradation of the liquid crystal panels 100 can be suppressed, and the amount of light that exits out of the projection lens 1207 can be increased.

In the projector 1000 according to the present embodiment, it is preferable that the reduction optical systems 1201, 1202, and 1203 are each formed of the plurality of lenses 60 and 70. According to the configuration described above, the reduction optical systems 1201, 1202, and 1203 are each formed of the plurality of lenses 60 and 70, whereby aberrations produced by the reduction of the pencil of light can be reduced. Furthermore, the reduction optical systems 1201, 1202, and 1203 can bring the light into focus at the same position on the light incident side of the projection lens 1207, whereby loss of the light can be suppressed.

Since the liquid crystal panels 100 each have a large size, the pixels P also each have a large size, whereby spread of the light due to the diffraction effect of the liquid crystal panels 100 is suppressed. The amount of light lost by the projection lens 1207 is therefore reduced, whereby the light utilization efficiency is improved.

The ratio of the area occupied by the liquid crystal disclination (domain) that occurs in each of the pixels P is reduced, whereby the display quality is improved.

As a countermeasure against the domain, it is not necessary to lower the potential between the pixel electrodes 15 and the counter electrode 21 of each of the liquid crystal panels 100, so that a wider dynamic range can be secured, whereby the transmittance of the liquid crystal panel 100 is improved. The brightness, the contrast ratio, and other display qualities of the projector 1000 are thus improved.

Since the ratio of the area occupied by the TFTs 30 to the area of one pixel P decreases, the liquid crystal panels 100 can each be designed so as to reduce the degree of light collection performed by a microlens array disposed therein. In addition, the local optical density in each of the pixels P and an increase in the temperature due to the light incident on the TFTs 30 are suppressed, whereby the light resistance lifetime of the liquid crystal panels 100 can be prolonged.

Variations of the embodiments described above will be described below.

Figure 7:
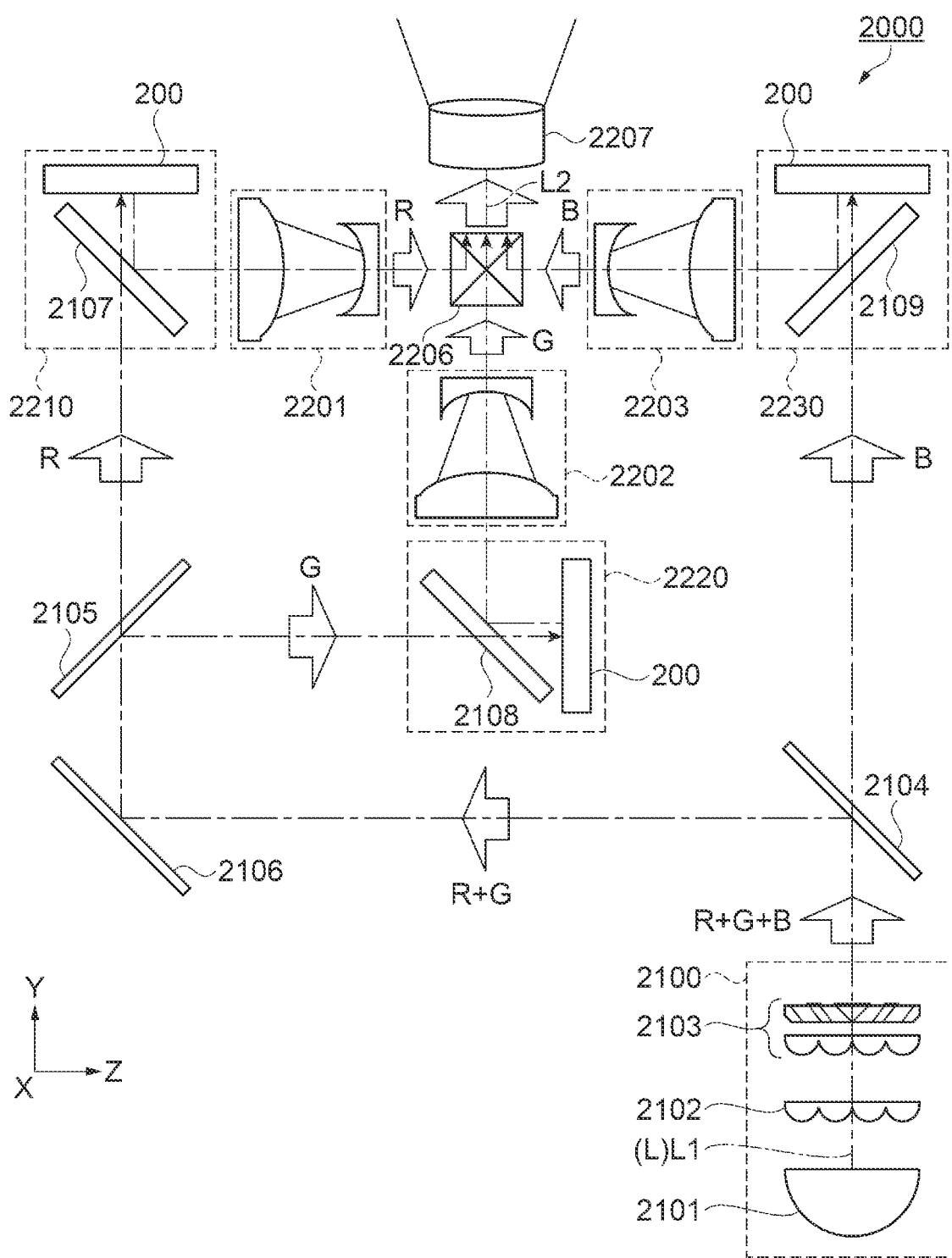
FIG. 7 is a diagrammatic view showing the configuration of a projector according to a variation.

The projector 1000 is not limited to a transmissive projector as in the embodiment described above, and may instead be a reflective projector 2000 shown in FIG. 7. FIG. 7 is a diagrammatic view showing the configuration of the projector 2000 according to a variation.

The projector 2000 according to the variation includes a polarized light illuminator 2100 and two dichroic mirrors 2104 and 2105 disposed along the system optical axis L, as shown in FIG. 7. The projector 2000 further includes a reflection mirror 2106, three wire-grid polarizers 2107, 2108, and 2109, and three reduction optical systems 2201, 2202, and 2203. The projector 2000 further includes three reflective liquid crystal light valves 2210, 2220, and 2230, a light combining prism 2206, and a projection lens 2207.

The polarized light illuminator 2100 includes a lamp unit 2101, an optical integration lens 2102, and a polarization converter 2103.

The dichroic mirror 2104 transmits the blue light (B) and reflects the red light (R) and the green light (G) out of the first light L1 outputted from the polarized light illuminator 2100. The other dichroic mirror 2105 reflects the green light (G) reflected off the dichroic mirror 2104 and transmits the red light (R) reflected off the dichroic mirror 2104.

The red light (R) enters the liquid crystal light valve 2210. The green light (G) enters the liquid crystal light valve 2220. The blue light (B) enters the liquid crystal light valve 2230.

For example, the liquid crystal light valve 2210 includes a reflective liquid crystal panel 200 and the wire-grid polarizer 2107. Specifically, the wire-grid polarizer 2107 is disposed between the liquid crystal panel 200 and the reduction optical system 2201. The liquid crystal light valve 2210 is so disposed that the red light (R) reflected off the wire-grid polarizer 2107 is incident on the light incident surface of the light combining prism 2206 at right angles via the reduction optical system 2201.

The configuration of the reflective liquid crystal light valve 2210 and the arrangement of the components thereof are the same as those of the other reflective liquid crystal light valves 2220 and 2230. The color beams incident on the liquid crystal light valves 2210, 2220, and 2230 enters the light combining prism 2206 via the reduction optical systems 2201, 2202, and 2203. The light combining prism 2206 combines the color beams with one another, and the combined light is projected onto the screen via the projection lens 2207, so that a magnified image is displayed on the screen.

As described above, the projector 2000 according to the variation is preferably a reflective projector including the wire-grid polarizers 2107, 2108, and 2109 between the liquid crystal panels 200 and the reduction optical systems 2201, 2202, 2203. The configuration described above can also suppress increases in the size and weight of the reflective projector 2000. Furthermore, degradation of the liquid crystal panels 200 can be suppressed, and the amount of light that exits out of the projection lens 2207 can be increased.

In the projector 1000 according to the embodiment described above, it is preferable that the polarization converter 1103 is disposed between the lamp unit 1101 and the color separation system 1110, and that a magnifying optical system is disposed between the polarization converter 1103 and the color separation system 1110. According to the configuration described above, in which a magnifying optical system is disposed between the polarization converter 1103 and the color separation system 1110, an increase in the size of the polarization converter 1103 can be suppressed as compared with a case where the pencil of light is enlarged upstream of the polarization converter 1103. Furthermore, only one magnifying optical system suffices because the magnifying optical system is disposed upstream of the color separation system 1110.

The reduction optical systems 1201, 1202, and 1203 are not necessarily arranged in correspondence with all the colors, the blue light (B), the red light (R), and the green light (G). For example, the reduction optical system 1203 may be disposed for the blue light (B) only. The configuration described above, in which the blue pencil of light is reduced by the reduction optical system 1203, can, for example, suppress degradation of the liquid crystal panel 100 for the blue light, which has a wavelength shorter than those of the red light and the green light.

In this case, the liquid crystal panel 100, the effective display region E of which is larger than the effective area of the light incident surface 1206a of the light combining prism 1206 is only the liquid crystal panel 100 corresponding to the blue light (B), and the areas of the effective display regions E of the liquid crystal panels 100 for the red light (R) and the green light (G) may not be greater than the effective area of the light incident surfaces 1206a of the light combining prism 1206.

The lamp unit 1101 formed of a white light source, such as an ultrahigh-pressure mercury lamp and a halogen lamp, is not necessarily used as the light source apparatus, and a laser light source may, for example, be used as the light source apparatus.

The area of the effective display region E of each of the liquid crystal panels 100 is not necessarily greater than the effective area of the corresponding light incident surfaces 1206a of the light combining prism 1206. The area of the effective display region E of each of the liquid crystal panels 100 may be equal to the area in the related art, and the effective area of the corresponding light incident surface 1206a of the light combining prism 1206 may be reduced.

What is claimed is:

1. A projector comprising:
    a light source apparatus;
    a color separation system that separates first light outputted from the light source apparatus into a plurality of color beams;
    a plurality of light modulators that modulate the plurality of separated color beams from the color separation system;
    reduction optical systems that reduce at least one of pencils of light formed of the plurality of color beams modulated by the plurality of light modulators
    a light combining prism that combines the plurality of reduced color beams with one another; and
    a projection optical apparatus that projects second light that is the combined light from the light combining prism,
    wherein the reduction optical systems are disposed between the light modulators and the light combining prism,
    an area of an effective display region of each of the light modulators is greater than an effective area of each light incident surface of the light combining prism, wherein the area of the effective display region is an area of a functional film provided at the light combining prism, and
    wherein the projector is a reflective projector including wire-grid polarizers disposed between the light modulators and the reduction optical systems.

2. The projector according to claim 1,
    wherein the reduction optical systems are each formed of a plurality of lenses.

3. The projector according to claim 1,
    wherein the plurality of color beams include at least a blue beam, and the reduction optical system for the blue light is disposed between the light modulator that modulates the blue light and the light combining prism.

* * * * *